Figure 1:
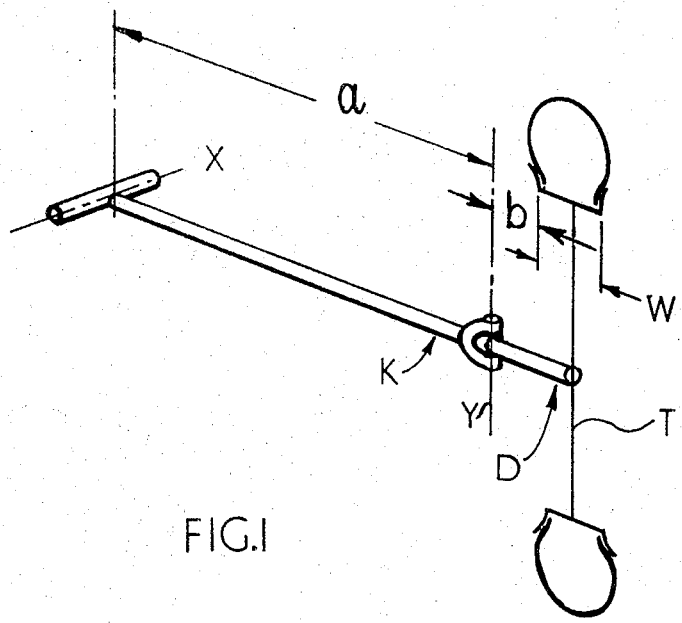

United States Patent [19]
Wortley

[11] 3,782,217
[45] Jan. 1, 1974

[54] BALANCING OF WHEEL/TYRE ASSEMBLIES

[75] Inventor: William Wortley, Birmingham, England

[73] Assignee: Dunlop Limited, London, England

[22] Filed: Apr. 14, 1972

[21] Appl. No.: 244,123

[30] Foreign Application Priority Data
Apr. 22, 1971  Great Britain.................. 10,754/71

[52] U.S. Cl.................................... 73/457, 73/459
[51] Int. Cl. ........................................... G01m 1/28
[58] Field of Search............................. 73/457, 459

[56] References Cited
UNITED STATES PATENTS
3,678,761  7/1972  Blackburn........................... 73/457
3,680,390  8/1972  Bjorn.................................. 73/457

Primary Examiner—James J. Gill
Attorney—Richard K. Stevens et al.

[57] ABSTRACT

A method of balancing a tyre and wheel assembly which comprises rotating said assembly and measuring the kinetic and dynamic out of balance forces so generated. A known proportion of the correction weight for the kinetic unbalance so measured is then applied to one flange of the wheel and the kinetic and dynamic out of balance forces measured again. The new measurements are compared with the initial ones to determine the total correction weight required and its distribution between the wheel rim flanges. The method is particularly suited to on-the-car balancing.

7 Claims, 3 Drawing Figures

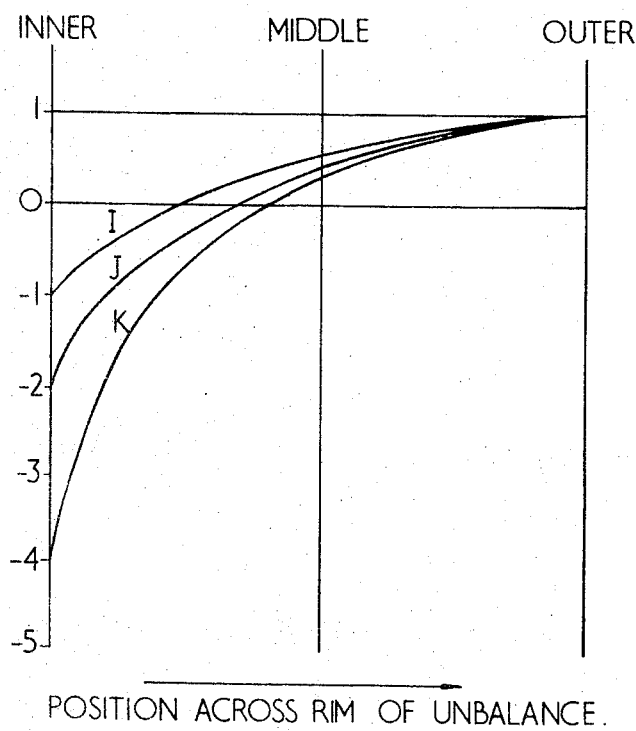

BALANCING OF WHEEL/TYRE ASSEMBLIES

This invention relates to balancing wheel/tyre assemblies.

When a wheel-tyre assembly is out of balance, rotation of the assembly can give rise to out-of-balance forces which act as couples about a vertical axis and about a horizontal axis, both axis being parallel with the plane of rotation of the assembly. The couple acting about the horizontal axis is referred to as the kinetic unbalance and the couple acting about the vertical axis is referred to as the dynamic unbalance. In order to correct the unbalance of wheel/tyre assemblies weights are applied to the flanges of the wheel rims, and in a simple method of balancing, weights are simply attached to one or both flanges to effect a static balance of the assembly about its rotational axis. To correct both the kinetic and dynamic balance referred to above the balancing weights must be split between the flanges in such a way that the centre of gravity of the weights lies in the same plane as the resultant of the unbalance of the wheel and tyre.

Using present methods of balancing on the car, if it is desired to correct for kinetic and dynamic unbalance it is necessary first to kinetically balance the wheel/tyre assembly and then to perform a second separate balancing step with the wheel rotating and so to add further weights to distribute the weight correctly between the rim flanges. The usual result of this is that the method is slow and necessitates the positioning of three sets of weights on the rim, instead of the two sets which would be the theoretical maximum needed to correct the unbalance in any particular instance.

According to the present invention a method of balancing a tyre and wheel assembly comprises rotating said assembly and measuring the kinetic and dynamic out-of-balance forces thus generated, applying a known proportion of the correction weight for the kinetic unbalance so measured to one flange of the wheel, rotating the assembly again and measuring the kinetic and dynamic out-of-balance forces now generated, and comparing the new kinetic and dynamic measurements with the initial measurements to determine the total correction weight required, and its distribution between the flanges.

Preferably the kinetic and dynamic out-of-balance forces are measured with the wheel and tyre assembly in position on the vehicle. The wheel and tyre assembly may be rotated, for example, by a rotatable drum or fly wheel and the kinetic and dynamic out-of-balance forces measured on the car preferably by an electronic method of force measurement which substantially prevents movement of the car suspension from taking place.

Figure 2:
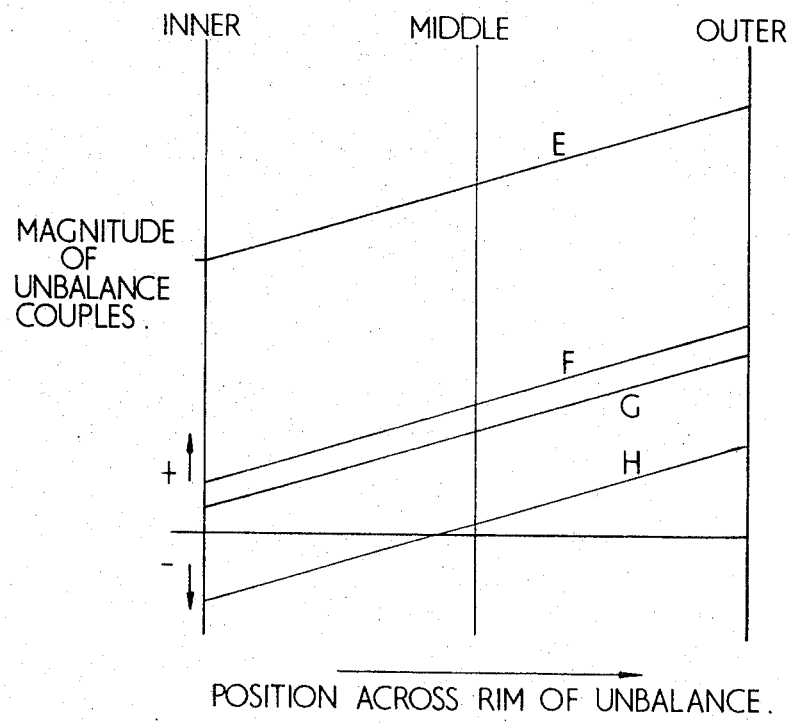

Various aspects of the invention will be explained in more detail with reference to the accompanying drawings of which:

FIG. 1 is a schematic representation of a car suspension system,

FIG. 2 is a graph showing the variation of the kinetic and dynamic unbalance couples with the position of the point of unbalance between the flanges both without correction and after application of a half correction to the outer rim flange, and FIG. 3 is a graph showing the variation in the ratio of the kinetic and dynamic unbalance couples with position of the point of unbalance between the rim flange after ($a$) the dynamic unbalance has been scaled up electronically to the same reading as the kinetic and $b$) a half correction of the kinetic unbalance has been applied to the outer rim flange.

A simplified representation of a car suspension system is shown in FIG. 1 of the accompanying drawings. The wheel and tyre sssembly T pivots about the vertical axis Y and about the horizontal axis X. The kinetic unbalance forces act as a couple about the axis X and the dynamic forces act as a couple about the axis Y. Thus the measurement of the kinetic unbalance may be carried out by force measurement sensing vertical oscillations in region K, the vertical oscillations acting about axis X. Similarly the measurement of the dynamic unbalance may be carried out by force measurement sensing horizontal oscillations in region D the horizontal oscillations acting about axis Y.

In the accompanying FIG. 2 is shown a graph which illustrates the variation in the couples about each axis as the unbalance moves from the inner to the outer flange. Line E is the initial Kinetic couple and line G is the initial Dynamic couple. Also shown, by lines F AND H, is the variation in the Kinetic and Dynamic couples respectively as the unbalance moves from the inner to the outer flange when a correction weight equal to half the equivalent of the initial kinetic unbalance at the flange radius is applied to the outer wheel flange diametrically opposite the unbalance location.

Since the length of the kinetic arm $a + b$ (see FIG. 1) is greater than the length of the dynamic arm $b$ the magnitude of the kinetic couple is greater than the dynamic but the effect of the addition of the correction weight on the dynamic couple is very noticeable as the unbalance moves across the rim (total rim width $w$).

In the initial measurement the exact weight required to correct for the kinetic unbalance is not determined. This is because the same measurement could be produced by slightly differing weights depending upon the lateral position of the unbalance across the wheel/tyre assembly.

If the position of the unbalance in the wheel/tyre assembly is initially on the outer flange the addition of the half correction on the outer flange will reduce the dynamic and kinetic by half. If the position of the unbalance is on the inner flange the half correction will reduce the kinetic couple but will generally reverse the dynamic couple as shown by line H on FIG. 2 since the distance $b$ is usually much less than $a$ and this can cause the latter to be increased although in the reverse direction. If the lengths $b$, $a$ and $w$ are all known then the only two variables are the exact weight of unbalance and its exact position and from the two measurements with and without the known correction weight these variables can be accurately calculated.

If $x =$ unbalance and $y =$ distance of unbalance from inner flange.

For the 1st measurements kinetic reading $= k_1$, dynamic reading $= d_1$, and taking moments about the axes $X$ and $Y$ we obtain the following equations:

1. $k_1 = (a + b + y) x$
2. $d_1 = (b + y) x$

With a correction weight $x_2$, preferably approximately equal to half the required correction for the first kinetic measurement, applied to the outer flange, the second measurements give kinetic reading $= k_2$ and dyanmic reading $= d_2$ so that again taking moments about axes $X$ and $Y$.

3. $k_2 = (a + b + y) x - (a + b + w) x_2$
4. $d_2 = (b + y) x - (b + w) x_2$

Rearranging 4, we obtain $x (b + y) = d_2 + (b + w) x_2$

5. $b + y = [d_2 + (b + w) x_2]/x$

Substituting 5 into Equation 3

6. $k_2 = (a + d_2 + (b + w) x_2)/x \cdot x - (a + b + w) x_2$ hence $k_2 = ax + d_2 + (b + w) x_2 - (a + b + w) x_2$ $k_2 = ax + d_2 - ax_2$ 7. $x = k_2/a - d_2/a + x_2$ clearly, by similar means the expression for $y$ may be found, and hence the necessary distribution of weight to one or either rim flange can be determined for the final correction. This calculation may, of course, be performed automatically, if desired, by provision of appropriate equipment. However, in many car suspension systems the distances $b$ and $a$ are not readily measurable. In these circumstances provided that $b << a$, and this is generally true, it is possible to obtain an approximate balance and a rapid method of achieving such a balance is available. It can be seen from FIG. 2 that the dynamic unbalance couple is considerably affected and may be reversed when the half correction for the kinetic unbalance is applied to the outer rim flange, depending upon the location of the actual unbalance. Thus the ratio between the dynamic couple and kinetic couple varies considerably after the addition of half correction and this variation depends upon the position of the unbalance of the wheel/tyre assembly between the rim flanges. One example of the manner in which this can be utilized will now be described.

The couples will generally be measured electronically so that it can be arranged after the initial measurements have been taken that the scale of the reading of the dynamic unbalance is altered so that the initial value of the dynamic unbalance is shown as the same as the kinetic unbalance. In this case when, for example, a half correction weight, is placed on the wheel rim outer flange and the kinetic and dynamic couples measured the ratio of the dynamic and kinetic couples vaires considerably according to the position of the unbalance between the rim flanges. This is illustrated in the graph in FIG. 3 of the accompanying drawings.

From FIG. 3 it can be seen that if the position of the unbalance of the wheel/tyre assembly is on the outer rim flange addition of the half correction has the same effect on both the kinetic and scaled-up dynamic readings. If however, the position of the unbalance is between the flanges the tendency is for the scaled-up dynamic couple to diverge from and become increasingly negative relative to the kinetic. The extent of the divergence is affected by the ratio of $b/w$ the lines I, J and K in FIG. 3 corresponding to $b/w$ ratios of ½, ⅓ and 1/5 respectively. From FIG. 3, however, it can be seen that an approximate balance can be obtained using this divergence if 1. all correction weight is placed on the outer flange when the second kinetic and dynamic balance readings are equal or the dynamic reading is positive and more than half the kinetic;

2. all the correction weight is placed on the inner flange when the dynamic reading is negative;

3. the correction weights are divided equally between the inner and outer flanges when the dynamic reading is positive and less than half of the kinetic.

The angular location of the unbalance can be most accurately placed on the initial reading and once this location has been determined all correction is placed diametrically opposite, ensuring that the minimum amount of correction weight will be used. The determination of the angular location of unbalance may be carried out in the usual manner e.g., stroboscopically.

Provided that the distance $a >> w$, which again is generally the case the weight correction for the initial kinetic reading will be sufficiently close to the necessary total weight correction for an approximate balance to be obtained.

Having now described my invention what I claim is:

1. A method of balancing a tyre and wheel assembly which comprises rotating said assembly and measuring the kinetic and dynamic out-of-balance forces generated, applying a known proportion of the correction weight for the kinetic unbalance so measured to one flange of the wheel, rotating the assembly again and measuring the kinetic and dynamic out-of-balance forces now generated, and comparing the new kinetic and dynamic measurements with the initial measurements to determine the total correction weight required, and its distribution between the flanges.

2. A method according to claim 1 in which the kinetic and dynamic out-of-balance forces are measured on the car.

3. A method according to claim 2 in which the measurements are carried out by an electronic method of force measurement which substantially prevents movement of the car suspension from taking place.

4. A method according to claim 1 in which the angular location of the unbalance is determined during the first measurements, the known proportion of the correction weight for the kinetic unbalance being applied in an angular location diametrically opposite the unbalance.

5. A method according to claim 2 in which the known proportion of the correction weight is applied to the outer flange of the wheel.

6. A method according to claim 1 in which the change of ratio of the dynamic measurement to the kinetic measurement between the first and second measurements is determined to indicate the location of the position of the unbalance between the wheel rim flanges.

7. A method according to claim 6 in which said change of ratio is determined by adjusting the scale of the dynamic and/or kinetic reading so that said readings are the same prior to the addition of the half correction and the taking of the second measurements whereby in the second measurements divergence of the dynamic reading from the kinetic will indicate the approximate position of the unbalance.

* * * * *